Jan. 14, 1964 M. J. WACLAWEK 3,117,661
WEAR COMPENSATING MECHANISM FOR A FRICTION DEVICE
Filed Jan. 2, 1962 2 Sheets-Sheet 1
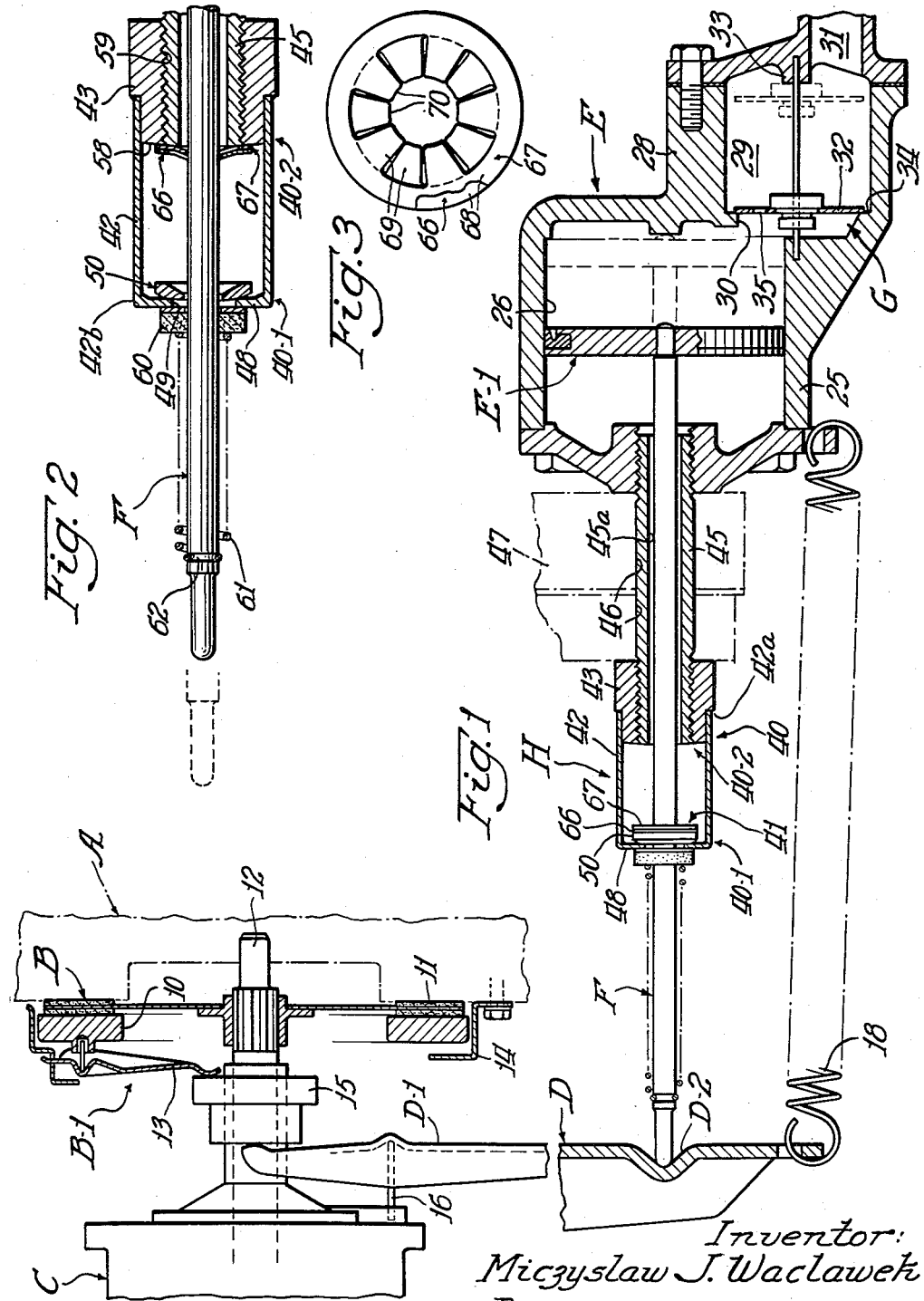
Inventor:
Miczyslaw J. Waclawek
By: Joseph W. Malleck Atty

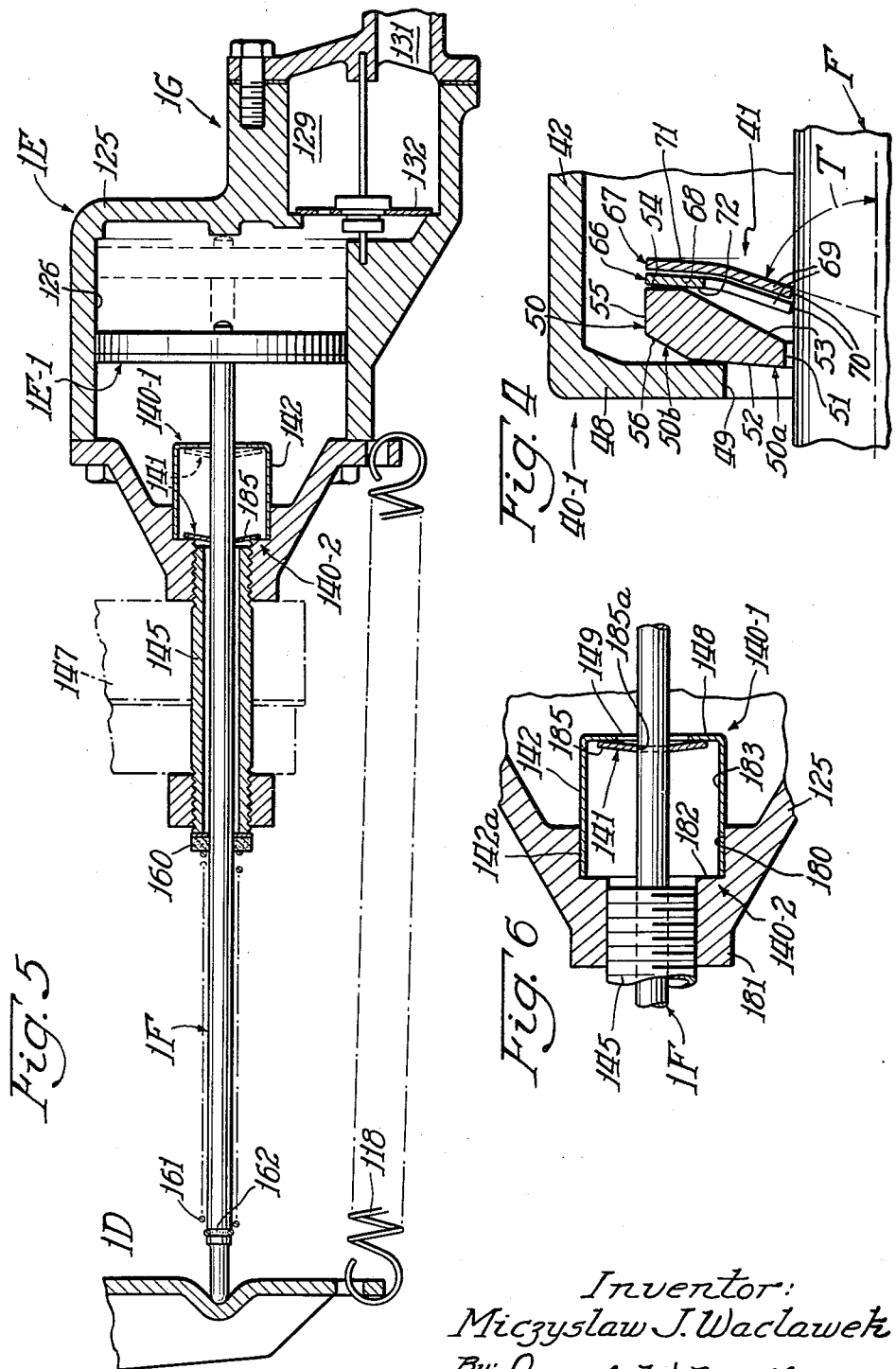

000
United States Patent Office 3,117,661
Patented Jan. 14, 1964

3,117,661
WEAR COMPENSATING MECHANISM FOR A FRICTION DEVICE
Miczyslaw J. Waclawek, Olympia Fields, Ill., assignor to Borg-Warner Corporation, Chicago, Ill., a corporation of Illinois
Filed Jan. 2, 1962, Ser. No. 163,659
3 Claims. (Cl. 192—111)

This invention relates to friction devices and more particularly to the provision of wear compensating means for friction devices of the type which are adapted to be engaged by a positive external hydraulic force applied through suitable linkage.

Heretofore, friction devices and particularly those of the clutch type commonly employed in automobiles, have incorporated a variety of wear compensating means to insure that a predetermined engaging force would continuously provide full clutch engagement throughout the operating life of the device. However, not until the recent advent of automatic clutch mechanisms, which are adapted to be actuated by an external hydraulic servomotor, has great interest been directed to the problem of wear compensation for devices which utilize a predetermined piston stroke to achieve full clutch engagement.

The broad features of this invention contemplate the construction of a wear compensating device which is of exceptional simplicity and economy and which may be easily adapted to existing hydraulic clutch actuating mechanisms already commercially available and in use. One of the particular features of this invention is the use of diaphragm means adapted to in part control the limits of axial movement of a thrust member and which diaphragm means may be adjusted on said thrust member by a predetermined force applied thereto. The simplicity and versatility of such wear compensating means is particularly notable upon assemblage of the device employing this invention whereby an installer may manually pull the servomotor thrust rod with ease causing the compensating means to automatically take up slack in the clutch system and automatically adjust interengaging parts; this slack take-up may also be permitted to occur upon the first stroke of the thrust member.

Therefore, it is a primary object of this invention to provide an improved friction device incorporating a novel wear compensating means which is particularly adaptable to friction devices of the type actuated by hydraulic servomotor acting through mechanical linkages such as levers.

Another object of this invention is to provide an improved wear compensating means for a friction device of the type actuated by an external hydraulic servomotor, the wear compensating means being particularly characterized in that it is simple, economical and easily accommodated to existing friction devices of the above type than any known wear compensation means known in the art.

Still another object of this invention is to provide an improved wear compensation means adapted to cooperate with a friction device of the type which is actuated by an hydraulic servomotor acting through mechanical linkage with the friction device, the compensation means being particularly adapted to accommodate nutation of a thrust member interconnecting the servomotor and the friction device while operating directly thereon to incrementally adjust the stroke of said thrust member for wear.

Still another object of this invention is to provide a novel wear compensation means in accordance with the preceding object and in which the compensating means is adapted to be employed either internally within the servomotor or externally thereof for adjusting the stroke of the thrust member.

Yet another object of this invention is to provide an improved wear compensation means which is highly compact. A particular construction feature pursuant to this object is the use of a pair of flexible diaphragms in interengaging face relationship, each diaphragm having an outer annular margin with a plurality of radially inwardly extending fingers, each finger terminating in a lip adapted to resiliently engage the outer surface of the thrust member with a predetermined frictional force, the fingers being circumferentially spaced apart a distance equal to or greater than the width of each finger, and the fingers on both diaphragms being arranged so as not to superimpose in an axial direction and thereby each finger engages a different circumferential portion of the outer surface of the thrust member, the diaphragm being of unusually compact construction and adapted to interengage with a pair of stops spaced axially along the thrust member for limiting the reciprocal movement thereof.

This invention consists of the novel constructions, arrangements and devices to be hereinafter described and claimed for carrying out the above stated objects and such other objects as will be apparent from the following description of a preferred form and alternative embodiment of this invention and illustrated with reference to the accompanying drawings, wherein:

FIGURE 1 is in part a schematic layout indicating one type of clutch arrangement which this invention is particularly adapted to form a part and is also in part a central sectional view of the actuating mechanism; an alternative operating position of the piston is illustrated in broken outline;

FIGURE 2 is an enlarged view of the wear compensating means disposed about the thrust member, similar to that in FIGURE 1; the diaphragm means is shown in the extreme right position for engaging one of the stops when the thrust member is moved in the return stroke of the piston;

FIGURE 3 is a plan view of a pair of diaphragms forming a part of the wear compensating means;

FIGURE 4 is a still further enlarged fragmentary view of a portion of the wear compensating means shown in FIGURE 1;

FIGURE 5 is a sectional elevational view of another wear compensating means like that in FIGURE 1 and illustrating an alternative embodiment of this invention; the piston and diaphragm are illustrated in other operative positions as shown in broken outlines; and FIGURE 6 is a fragmentary enlarged view of a portion of the wear compensating means shown in FIGURE 5.

Referring in greater detail to the figures of the drawings and first to FIGURE 1, there is illustrated schematically a preferred automatic clutch transmission system of which my invention is particularly adapted to form a component part. The features of this invention are of particular significance in the automatic clutch device of the type disclosed in U.S. patent application Serial Number 128,916 (assigned to the assignee of this invention), the disclosure of which is incorporated herein by reference.

In an automatic clutch system of the latter type, the engaging force is generated externally by an hydraulic servomotor and applied by suitable mechanical linkage to achieve full clutch engagement. This type of clutch should be distinguished from ones incorporating spring means which normally urge the friction elements into engagement and which spring means must be overcome to effect disengagement of the clutch; problems of wear compensation are different. Also to be distinguished are clutches of the overcenter type and direct non-feathering engaging hydraulic clutches which present wear compensation problems apart from the disclosure herein.

For purposes of convenience, the type of clutch disclosed in applicant's Serial Number 128,916 shall be referred herein as "springless." As in FIGURE 1, the springless type clutch transmission system broadly comprises the following elements: a driving member A formed as a flywheel which is driven by an engine (not shown) and adapted to selectively transmit rotative power by means of a clutch B to a change-speed transmission mechanism C; operation of the clutch device B is provided by actuation of an operating member or throw arm D which is adapted to apply force to a lever system B-1 of the clutch device. The operating member D is moved for clutch engagement by a hydraulic servomotor E having a piston E-1 interconnected with the operating member D by way of a thrust member F; the servomotor is of the volume modulated type having hydraulic fluid metered to it by an accumulator valve means G which in turn receives pressurized fluid from a source (not shown) responsive to engine speed as disclosed in the reference application. A wear compensating means H is mounted about the thrust member F adapted to cooperate therewith to adjust the stroke of the thrust member.

The clutch device D, briefly, comprises an annular pressure plate 10 adapted to cooperate with said flywheel A to clamp a driven disc 11 therebetween for imparting drive to a driven shaft 12 on which the driven disc 11 is splined. The pressure plate 10 is urged toward a clutch engaging position by a plurality of levers 13 having an outer end fulcrumed upon a cover plate 14 secured to the flywheel A and having an intermediate portion in engagement with the pressure plate 10; an inner end of each lever is adapted to be actuated by a thrust collar 15 suitably mounted on the driven shaft 12 for reciprocal movement. The pressure plate 10 is adapted to be retracted from the driven disc 11 by retraction springs or other means (not shown).

The operating member D is adapted to act as a lever in imparting axial thrust to the thrust collar 15. The operating member D has an intermediate portion D-1 pivoted upon a strut 16 which in turn is in engagement with a portion of the transmission C; an inner end of the operating member D engages the collar 15 and an outer end carries a recessed seat D-2 adapted to journal the end of the thrust member F. The operating member D is adapted to be maintained in light operative engagement with the thrust member partly by means of a coiled tension spring 18 urging the outer end of the operating member to the right (as shown in FIGURE 1). The tension spring has opposite ends respectively interconnecting the operating member D and a stationary fixture, such as the servomotor E.

The servomotor E comprises a housing 25 with a cylindrical servomotor chamber 26 slidably receiving said piston E-1 in sealing relationship. The thrust member F is fastened to a central portion of the piston E-1 and is adapted to be reciprocated upon actuation of the piston.

The servomotor housing 25 is provided with a cylindrical extension 28 having an accumulating chamber 29 formed therein. An opening 30 provided in the housing 25 is adapted to communicate the accumulating chamber 29 and the servomotor chamber 26; a fluid inlet 31 is provided in the extension 28 which is in communication with a suitable fluid source and preferably one which is responsive to engine speed as disclosed in application Serial Number 128,916.

The servomotor E is adapted for volume modulation in the sense that a specific quantity of fluid is adapted to be initially introduced into the chamber 26 for actuating the piston. In order to provide such volume modulation, an accumulator valve 32 is adapted to be operably mounted within the chamber 29 having an outer periphery smaller than the internal diameter of the chamber 29. The valve 32 is adapted to be moved between a first position wherein it is stationed in abutment with a boss 33 at the extreme right of the chamber 29 and an opposite position wherein its outer periphery engages an annular shoulder 34 at the left end of the chamber 29. Therefore, it can be readily seen that in the extreme right position, fluid is permitted to flow around the valve until such time as the valve is urged against the shoulder 34 and thereafter fluid is permitted to flow into the servomotor chamber 26 through a small port 35 provided in the valve 32. As a result, the initial portion of the servo piston stroke takes up the clearances in the linkage and bearing and puts a small preload on the clutch. This piston motion must be fast and is accomplished by the accumulator valve. To fully engage the clutch smoothly the build up of pressure must be gradual and the final portion of the piston stroke must be slow. This is accomplished by feeding the piston chamber through the small port 35.

Turning now more specifically to wear compensating means H, it generally comprises a stop means 40 adapted to cooperate with an adjusting or diaphragm means 41 in regulating the stroke of the thrust member to compensate for wear. The stop means 40 includes a cylindrical sleeve 42 having one end 42a mounted about a bushing 43 which in turn is threadably secured upon a tube 45; the tube 45 surrounds the thrust member F and is supported within openings 46 provided respectively in the servomotor housing 25 and peripheral portions 47 of the clutch device B. The tube 45 has an internal diameter 45a larger than the diameter of the thrust member to permit the thrust member F to nutate therein during reciprocal movement of the piston; the nutation is necessary to accommodate the slight arcuate movement of the outer end of the operating member D with which it engages. The end 42a of the sleeve, the end most remote from the servomotor, is provided with a radially inwardly extending flange 48 having a central opening 49 loosely receiving the thrust member F.

A stop ring 50 (see FIGURE 2) is placed within the sleeve 42 and positioned to engage the inner side of the sleeve flange 48. The stop ring, as more particularly shown in FIGURE 4, is formed with an inner radial portion 50a adapted to surround the thrust member in spaced relation; an outer radial portion 50b of the stop ring is adapted to be slightly axially offset from the radially inner portion 50a for engaging the diaphragm means 41 at a specific radial distance as will be hereinafter described. The inner radial portion 50a is defined by an inner cylindrical wall 51, a generally radially extending wall 52 (wall 52 is shown in FIGURE 4 with a slight angle with respect to a plane perpendicular to the thrust member), and a conical wall 53 extending outwardly radially from the wall 51. The outer radial portion 53 of the ring is defined by a generally radially inwardly extending wall 54 (shown on the right hand side in FIGURE 4) intersecting wall 53, an outer cylindrical wall 55, and a conical wall 56 extending inwardly from the outer wall 55 and intersecting the wall 52. The stop ring 50 cooperates with the sleeve flange 48 to complete one stop 40-1 adapted for limiting the axial reciprocation of the thrust member F.

Another stop 40-2 is formed as an integral part of bushing 43 and comprises a sector of a spherical surface 58 facing the interior of the sleeve 42. The spherical surface 58 is interrupted by a central opening 59 provided in the bushing to threadably receive an end of the tube 45.

In order to seal the interior of the compensating means H which may have fluid therein received from the servomotor E, a sealing element 60 is mounted on the thrust member adjacent the end 42b of the sleeve 42 and is adapted to seal between the thrust member F and the sleeve flange 48; the sealing element is held tightly against the sleeve flange by a coil compression spring 61 having one end bearing against the element 60 and having an opposite end received in a groove 62 on the thrust member F.

The diaphragm or adjusting means 41 is semimovably mounted on the thrust member F and adapted to selectively engage each of the stops for limiting the extremes of reciprocation of the piston and thrust member F. As shown particularly in FIGURES 3 and 4, means 41 comprises a pair of diaphragms 66 and 67; the diaphragms may be of the Belleville type. Each diaphragm comprises an annular outer margin or portion 68 with a plurality of resilient radially inwardly extending fingers 69, each finger terminating in a lip 70 adapted to frictionally engage the outer surface of the thrust member F with a predetermined force. The lips on each diaphragm are circumferentially arranged and describe a generally circular opening through the diaphragm. Each of the fingers 69 are spaced apart a distance generally equal to or greater than the width of each finger. The general radial extent of each finger as well as the adjoining outer portion 68 together are at an angle T relative to the axis of the thrust member F; the angle is chosen so that the diaphragm may angle toward the servomotor. The angle may be compound with a substantial proportion of each finger given a slightly greater angle with respect to the thrust member than the adjoining outer portion 68 of the diaphragm.

The side or face 71 of diaphragm 67 is adapted to engage the surface 58 of stop 40-2 when the thrust member is moved to far right position. The surface 58 is adapted to be generally commensurate in contour with face 71 so that in spite of nutation of the thrust member, the diaphragm 67 will substantially annularly engage the stop. In addition, the stop 40-2 is adapted to engage an outer radial portion of the diaphragm tending to flatten the diaphragm and lock the lips 70 more tightly against the thrust member when the latter is urged to the right by spring 18. The side or face 72 of diaphragm 66 is adapted to engage the stop ring 50 when the diaphragm means is moved thereagainst. Similarly the diaphragm 66 is engaged at an outer radial portion so that the diaphragms will tend to assume a more conical shape when the thrust member is urged to the left and thereby slightly loosen the frictional locking force between the diaphragms and thrust member. The diaphragm 66 is also assured of full annular interengagement with ring 50 in spite of nutation of the thrust member.

For purposes of the preferred embodiment, the diaphragms are calibrated to grip the thrust member with a force which can be overcome by a generally minimum force of 3 p.s.i. applied to the thrust member in the forward stroke (to the left in FIGURE 1) and 12 p.s.i. in the return or backward stroke.

An alternative embodiment is illustrated in FIGURES 5 and 6 and the same reference characters prefixed by "1" are used throughout to indicate similar parts to that of the preferred embodiment. In the alternative embodiment, sleeve 142 is mounted internally of the servomotor chamber 126 and has one end 142a journaled in a seat 180 formed in a neck portion 181 of the servomotor housing 125. The stop 140-2 is comprised of an annular shoulder 182 formed on the housing 125 and spaced radially inwardly of the inner surface 183 of the sleeve 142. The other stop 140-1 is comprised of a radially inwardly extending flange 148 as in the preferred embodiment and has a central opening 149 spaced from the outer surface of the thrust member 1F. The adjusting or diaphragm means 141 comprises a single Belleville diaphragm 185 which is completely solid throughout its radial extent and has no perforations, slots or fingers formed therein. The diaphragm has a radial extent which is adapted to angle in a direction generally away from the piston 1E-1 and has an inner periphery 185a adapted to resiliently engage the outer surface of the thrust member with a predetermined frictional force calibrated similarly to the preferred embodiment.

Briefly, the operation of the preferred embodiment includes introduction of fluid into the chamber 26 by means of the accumulating valve means G, the thrust member F will be urged to the left until clutch engagement is achieved. The stops 40-1 and 40-2 are adjusted at the outset so that the predetermined travel of the thrust member will be commensurate with the spacing between the stops. Therefore, before wear occurs, the diaphragm means will lie adjacent or in touching relation with the respective stops at the ends of each stroke. Upon relief of pressure in chamber 26, the thrust member will be urged back by spring 18.

When wear occurs, the force of fluid pressure in the servomotor will be sufficient to overcome the frictional force applied by the diaphragm 66 and 67 to the thrust member F and continue to urge the thrust member to the left until full clutch engagement is achieved. The diaphragms will adjust their axial position on the thrust member since they are restrained against further movement to the left by stop ring 50. Upon the return stroke, the thrust member will be prevented from returning to its starting position due to the adjusted diaphragms and thereby the piston E-1 will assume an incrementally new starting position.

A chief advantage of this invention is the facility for manual slack adjustment afforded by merely pulling the thrust member to a full clutch engaging position. The servomotor housing may still be constructed relatively compact since after a period of wear, the user may return the piston to its original starting by pushing the thrust member all the way back and overcome the 12 p.s.i. force which lock the diaphragms thereon.

While I have described my invention in connection with certain specific constructions and arrangements, it is to be understood that this is by way of illustration and not by way of limitation, and that the scope of my invention is defined solely by the appended claims which should be construed as broadly as the prior art will permit.

I claim:

1. The combination comprising: means having interengageable friction elements and an operating member adapted for actuation to urge said friction elements together; a servomotor; a thrust member interconnecting said operating member and servomotor and adapted to have a predetermined stroke for engaging said elements before wear occurs; and wear compensating means adapted to be mounted about said thrust member and including means providing stops spaced apart axially of said thrust member a distance generally commensurate with said predetermined stroke and Belleville type diaphragm means on said thrust member adapted to engage said stops, said stop means having one stop comprising a sleeve with an annular radially inwardly extending flange and a ring member disposed about said thrust member in engagement with said flange, said ring member having an outer portion offset axially from an inner portion thereof, said stop means having another stop comprising a bushing secured against movement and carrying a segmental spherical surface generally commensurate in contour to a side of said diaphragm means for interengagement, said diaphragm means comprising a pair of Belleville diaphragms each having a flexible annular margin with a plurality of stiff radially inwardly extending fingers, each finger terminating in a lip adapted to engage the outer surface of said thrust member, said lips of both diaphragms being adapted to engage a different circumferential portion of said thrust member outer surface, said fingers being bowed outwardly to one side of said diaphragm margin so as to apply a resilient predetermined frictional force to the thrust member, said servomotor being adapted to urge said thrust member in one direction to engage said friction elements with a force greater than that applied by said predetermined frictional force of the diaphragm fingers; resilient means normally urging said thrust member in an opposite direction tending to permit disengagement of said elements with a force less than that applied by said predetermined frictional force of said diaphragm fingers, said ring member outer portion being adapted to engage the outer periphery of said diaphragm means tending to slightly lessen the frictional force applied by said diaphragm means to the thrust member when the thrust member is moved in said one direction beyond the one stop, said ring member being adapted to provide for the substantial annular reaction force of said one stop to be applied to said diaphragm regardless of the nutation of the thrust member to compensate for extremely small incremental wear, and said segmental spherical surface being adapted to engage the outer periphery of said diaphragm means to further lock said diaphragm means with the thrust member when the thrust member is moved in said opposite direction beyond said another stop.

2. A combination comprising means having interengageable friction elements and a pivotal operating member adapted for actuation to urge said friction elements together; a servomotor having an axially reciprocal element; a thrust member interconnecting one end of said operating member and said servomotor element and adapted to have a predetermined stroke for engaging said elements before wear on the friction elements occurs, said thrust member nutating during said stroke to accommodate arcuate movement of said operating member and axial reciprocation of said servomotor element; and wear compensating means comprising a pair of stops spaced apart axially of said thrust member, said compensating means also having at least one Belleville diaphragm mounted on said thrust member adapted to engage each of said stops during the forward and reverse movement of said thrust member, said stops being secured against axial movement and said diaphragm being adapted to adjust on said thrust member when moved against one of said stops in one direction and being adapted to lock with said thrust member when moved against the other stop in an opposite direction whereby the stroke of said thrust member may be adjusted to compensate for wear occurring between said friction elements, said stops including means adapted to provide for the substantial annular reaction force of the stops to be applied to said diaphragm regardless of the nutation of said thrust member whereby relatively small incremental wear adjustments may be effected.

3. A combination comprising means having interengageable friction elements and a pivotal operating member adapted for actuation to urge said friction elements together; a servomotor having an axially reciprocal piston; a thrust member interconnecting said operating member and said servomotor piston and adapted to have a predetermined stroke for engaging said elements before wear occurs; seal means disposed about said thrust member and adapted to seal between said servomotor and thrust member; and wear compensating means comprising a pair of stops spaced apart axially of said thrust member and including a pair of Belleville type diaphragms placed together in interengaging face relationship, each diaphragm comprising an annular resilient outer margin having a plurality of radially inwardly extending fingers, each finger being stiff relative to said resilient outer margin, each finger terminating in a lip adapted to engage the outer surface of said thrust member with a predetermined frictional force, said servomotor piston being adapted to urge said thrust member in one direction with a force greater than said predetermined frictional force of said diaphragms thereon so that the diaphragms may engage one of said stops and adjust axially upon the thrust member; and resilient means normally urging said thrust member in an opposite direction having a force less than said predetermined frictional force of the diaphragms so that when the diaphragm is brought into engagement with the other of said stops there will be no adjustment in that direction, said diaphragms being adapted to adjust on said thrust member when they are prevented from movement by said one of the stops whereby the thrust member urges said fingers to stretch the resilient outer margin of each diaphragm to accommodate relative movement therebetween.

References Cited in the file of this patent
UNITED STATES PATENTS

| | | |
|---|---|---|
| 1,755,829 | Loughead | Apr. 22, 1930 |
| 2,536,269 | Driscoll | Jan. 2, 1951 |
| 2,965,207 | Snyder | Dec. 20, 1960 |
| 2,981,379 | Burrell | Apr. 25, 1961 |

UNITED STATES PATENT OFFICE
CERTIFICATE OF CORRECTION

Patent No. 3,117,661                January 14, 1964

Miczyslaw J. Waclawek

It is hereby certified that error appears in the above numbered patent requiring correction and that the said Letters Patent should read as corrected below.

Column 4, line 35, for "42a" read — 42*b* —.

Signed and sealed this 16th day of June 1964.

(SEAL)
Attest:

ERNEST W. SWIDER               EDWARD J. BRENNER
Attesting Officer                  Commissioner of Patents